(12) United States Patent
Greding

(10) Patent No.: US 9,555,577 B2
(45) Date of Patent: Jan. 31, 2017

(54) DEVICE AND PROCEDURE FOR EXPANDING THE END OF A PLASTIC PIPE

(75) Inventor: Arnd Greding, Hofheim (DE)

(73) Assignee: ROTHENBERGER AG, Kelkheim (DE)

( * ) Notice: Subject to any disclaimer, the term of this patent is extended or adjusted under 35 U.S.C. 154(b) by 912 days.

(21) Appl. No.: 13/406,581

(22) Filed: Feb. 28, 2012

(65) Prior Publication Data

US 2012/0217674 A1    Aug. 30, 2012

(30) Foreign Application Priority Data

Feb. 28, 2011    (DE) .................. 10 2011 000 975

(51) Int. Cl.
*B29C 57/04* (2006.01)
*B21D 41/02* (2006.01)
*B21D 39/20* (2006.01)
*B29L 23/00* (2006.01)

(52) U.S. Cl.
CPC .............. *B29C 57/04* (2013.01); *B21D 39/20* (2013.01); *B21D 41/026* (2013.01)

(58) Field of Classification Search
CPC ........ B29C 57/04; B21D 41/026; B21D 39/20
USPC ............................................. 425/393; 72/393
See application file for complete search history.

(56) References Cited

U.S. PATENT DOCUMENTS

| | | | | |
|---|---|---|---|---|
| 4,034,591 A * | 7/1977 | Rothenberger | ................. | 72/393 |
| 4,065,953 A * | 1/1978 | Frentzen et al. | ................. | 72/393 |
| 4,107,249 A * | 8/1978 | Murai et al. | ................. | 264/68 |
| 4,154,083 A * | 5/1979 | Rothenberger | ................. | 72/393 |
| 4,602,495 A * | 7/1986 | Yarnell | ................. | 72/393 |
| 5,046,349 A * | 9/1991 | Velte | ................. | 72/393 |
| 5,744,085 A | 4/1998 | Sorberg | | |
| 7,922,475 B2 | 4/2011 | Gueit | | |
| 8,517,715 B2 * | 8/2013 | Thorson et al. | ............. | 425/392 |
| 8,562,331 B2 * | 10/2013 | Schramm et al. | ............. | 425/393 |
| 2005/0126252 A1* | 6/2005 | Feldmann et al. | ............. | 72/393 |
| 2008/0160130 A1* | 7/2008 | Gueit | ............. | 425/393 |
| 2008/0196468 A1* | 8/2008 | Tanner et al. | ................. | 72/112 |

FOREIGN PATENT DOCUMENTS

| | | |
|---|---|---|
| DE | 7508327 U1 | 3/1977 |
| DE | 60008436 T2 | 1/2005 |
| DE | 102008061442 A1 | 9/2010 |

(Continued)

*Primary Examiner* — Atul P. Khare
(74) *Attorney, Agent, or Firm* — Leydig, Voit & Mayer, Ltd.

(57) ABSTRACT

A device for expanding an end of a pipe made of a plastic having a shape memory includes a plurality of spreading elements movable in a radial direction from a starting position, in which the spreading elements are insertable by a predetermined distance into the end of the pipe, to an outward-extended position, in which spreading surfaces of the spreading elements are each brought into an effective position against an interior surface of the end of the pipe, so as to expand the end of the pipe. A mechanism is configured to move the spreading elements from the starting position to the outward-extended position. An actuator is configured to vary a maximum radial distance of the spreading surfaces in the outward-extended position from a center axis. At least one fastener is configured to lock the radial maximum radial distance set by the actuator.

18 Claims, 4 Drawing Sheets

(56) References Cited

FOREIGN PATENT DOCUMENTS

| | | | |
|---|---|---|---|
| EP | 0725908 | B1 | 11/1998 |
| EP | 1938950 | A1 | 7/2008 |
| FR | 2451235 | A1 | 10/1980 |
| GB | 2100027 | A * | 12/1982 |

* cited by examiner

DEVICE AND PROCEDURE FOR EXPANDING THE END OF A PLASTIC PIPE

CROSS-REFERENCE TO PRIOR APPLICATION

This application claims priority to German Patent Application No. DE 10 2011 000 975.2, filed Feb. 28, 2011, which is hereby incorporated herein by reference. European Patent Application No. 12401015.8, which claims priority to German Patent Application No. DE 10 2011 000 975.2, is also hereby incorporated by reference herein.

FIELD

The invention relates to a device and a procedure for expanding the end of a pipe made of a plastic having a shape memory.

BACKGROUND

Plastic pipes are increasingly being used in gas and tap water supply piping. Frequently, plastics are used here that have a so-called shape memory. These plastic pipes are easily deformed and will, after deformation, try to return to their original shape.

Such material characteristics can be found preferably in pipes made of cross-linked polyolefins or of cross-linked polyethylene. These are synthetics having strong spatial cross-linking, such as Classes PE-X or XLPE.

The shape memory makes connecting these pipes into piping easier and simpler. Two plastic pipes can be connected to each other by expanding the joining ends of the plastic pipes and pushing a connecting element, such as a pipe connector, into the expanded ends of the plastic pipes. Due to the shape memory of the plastic pipes, the expanded ends will shrink so that at the end of the shrinking process, the pipe ends firmly grip the corresponding inserted portions of the connecting element and the desired pipe connection has thus been established. All that is necessary for connecting the pipes is expanding the pipe ends and inserting the connecting element into the expanded pipe ends.

For expanding the pipe ends, special devices are used as they are known, e.g., from EP 0 725 908 A1. The devices have a multitude of spreading jaws spreadable in a radial direction. The spreading jaws are pushed into the pipe end to be expanded and spread while expanding the pipe end. Frequently, the expanding process takes places in several expansion steps so that the pipe end is gradually enlarged to the desired expanded dimension.

SUMMARY

In an embodiment, the present invention provides device for expanding an end of a pipe made of a plastic having a shape memory including a plurality of spreading elements. Each of the spreading elements has a spreading surface configured to be brought into an effective position against an interior surface of the end of the pipe in an outward-extended position. Each of the spreading elements are movable, in a radial direction that extends radially from a center axis of the device, from a starting position, in which the spreading elements are insertable by a predetermined distance into the end of the pipe, to the outward-extended position, so as to expand the end of the pipe. A mechanism is configured to move the spreading elements from the starting position to the outward-extended position. An actuator is configured to vary a maximum radial distance of the spreading surfaces in the outward-extended position from the center axis. At least one fastener configured to lock the radial maximum radial distance set by the actuator.

BRIEF DESCRIPTION OF THE DRAWINGS

The present invention will be described in even greater detail below based on the exemplary figures. The invention is not limited to the exemplary embodiments. The invention may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Goals, advantages, characteristics and potential applications of this invention will result from the following description of several exemplary embodiments based on the drawings. All characteristics described and/or represented in the illustrations by themselves or in any meaningful combination are possible.

DETAILED DESCRIPTION

Figure 1A:
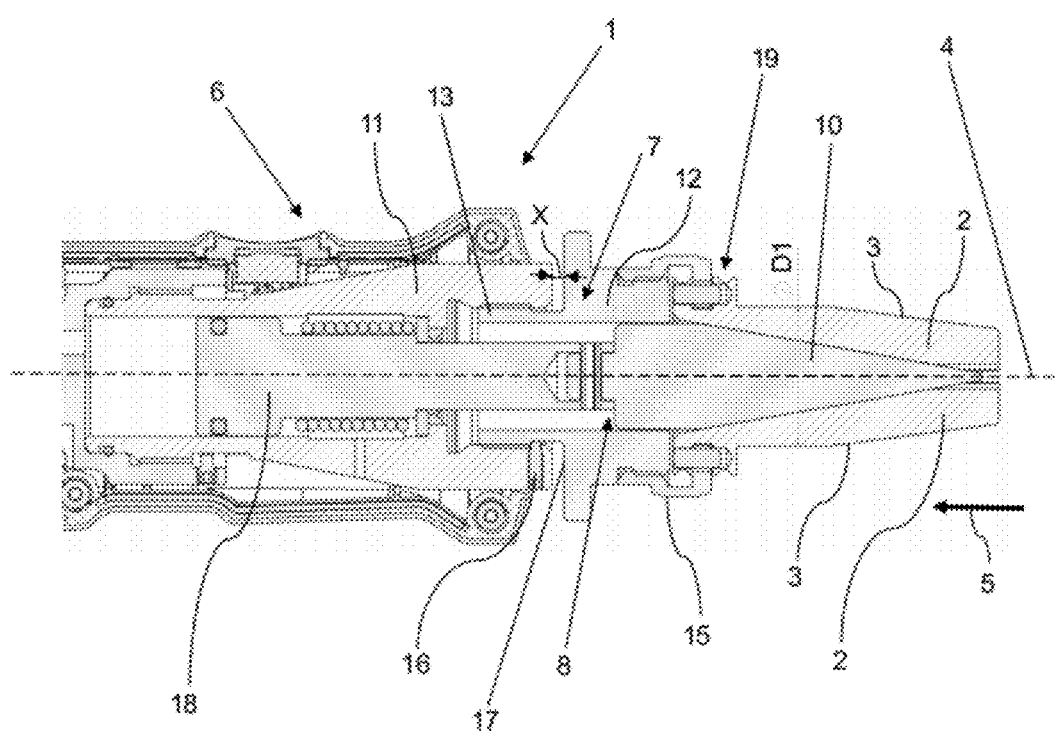
FIG. 1A shows an exemplary embodiment of a device for expanding the end of a pipe made of a plastic having a shape memory, as a longitudinal section view, with the spreading elements of the device being set to a first maximum expansion dimension and being in the radially outward-extended position.

Usually, a completed pipe connection using plastic pipes with shape memory can be made relatively fast since a firm pipe connection is effected within a short period of time due to the expanded pipe end shrinking.

It has been recognized in the present invention, however, that ambient temperature has a non-negligible effect on the duration of the shrinking process. If the pipe connection is made in cold temperatures, such as when pipes are laid outside or in unheated rooms in the winter months, it is possible that a finished pipe connection may not be achieved until after several hours and sometimes even after days. This makes building piping from many interconnected plastic pipes considerably harder. So for example, a leak-proof test cannot be performed on the piping until much later after the pipe installation has been completed.

Consequently, in an embodiment, the invention provides a device for expanding the end of a pipe made of a plastic having a shape memory with the characteristics described above, by means of which device a stable and firm pipe connection is achieved using an expanded pipe end after a reasonable period of time even in low ambient temperatures. In addition, in another embodiment, a corresponding procedure is provided.

In an embodiment, the present invention provides a device for expanding the end of a pipe made of a plastic having a shape memory, with several spreading elements each having a spreading surface that can be brought into an effective position against the interior surface of the pipe and that are movable in a radial direction with regard to a center axis from a starting position to an outward-extended position, with the spreading elements being insertable into the pipe end by a preset longitudinal distance in the starting position, and, in the extended position, with the spreading elements brought into the effective position with their spreading surface against the interior surface of the pipe so that the pipe end is expanded by moving the tensioning elements inserted into the pipe end from the starting position into the extended position, and with a mechanism for moving the spreading elements from the starting position to the extended position. In another embodiment, the invention provides a procedure for expanding a pipe made of a plastic having a shape memory.

A device according to an embodiment of the invention for expanding the end of a pipe made of a plastic having a shape memory has several spreading elements, each of which having a spreading surface that can be brought into an effective position against the interior surface of the pipe end and that are movable in a radial direction from a starting position into an outward-extended position with regard to a center axis. In the starting position, the spreading elements are insertable into the pipe end over a preset longitudinal distance or a preset distance. In the extended position, the spreading elements are in their effective position with their spreading surfaces against the interior surface of the pipe end so that the pipe end is expanded by moving the spreading elements inserted into the pipe from the starting position into the extended position.

Preferably, the spreading elements are arranged distributed around the center axis. Preferably, the spreading elements, in particular each spreading element, have an exterior circumference essentially the shape of a circular arc, which spreading elements preferably embody the spreading surface, in particular each spreading surface. Preferably, the spreading elements lie adjacent to each other in the starting position.

Preferably, the spreading elements are embodied such that, with regard to the center axis, the radial distance of each spreading surface will become at least partially larger from front to back, as seen in the direction of insertion. This allows expanding plastic pipes of different diameters using the same spreading elements. In the context of the invention, the direction of insertion shall be the direction in which the spreading elements are inserted into the pipe end.

Preferably, the spreading surfaces are embodied such that, at least in the starting position of the spreading elements, the spreading surfaces together form an essentially conical shape extending in the axial direction. The surface may be provided with fluting. And the circumference of the area formed by the spreading surfaces may also expand incrementally.

In addition, the device according to an embodiment of the invention has a mechanism for moving the spreading elements from the starting position into the extended position and if applicable, back into the starting position.

According to an embodiment of the invention, an actuator is provided by means of which the radial distance between each spreading surface and the center axis is variable in the extended position.

By allowing the radial distance between the spreading surfaces and the center axis to be variable in the extended position, the play with which the expanded end of the pipe surrounds the inserted section of a connecting element is variable in the radial direction. The play is flexibly enlargeable or reducible, as required, which allows changing the duration of the shrinking process of the expanded end.

Increasing the clearance or the play between the expanded end of the pipe and the connecting element section inserted therein results in an increased time period until a firm and stable connection; i.e., a finished connection, between the connecting element and the pipe is achieved due to the shrinking process of the expanded pipe end. In the reverse case, by reducing the play between the expanded pipe end and the connecting element section inserted therein, the time period of the shrinking process for achieving a firm and stable connection between pipe and connecting element is shortened.

By means of the measure according to an embodiment of the invention, the play is decreasable in such a manner that the expanded pipe end need reshrink only by a small amount in order to effect a firm and stable connection with the connecting element. Thus, the measure according to an embodiment of the invention can be used to effectively counteract slow reshrinking at low temperature occurring frequently when pipes are laid in cold winter months, by decreasing the radial distance between spreading surfaces and center axis in the extended position so much that a connecting element, e.g., can barely still be inserted without using a special insertion tool. Thus, even a minor shrinking process will already achieve a firm connection between the pipe and the connecting element.

The actuator can vary the radial distance between the spreading surface of a spreading element, in particular of a single spreading element, and the center axis. The actuator can also be embodied to vary the radial distance between any and all spreading surfaces and the center axis. It is possible that the actuator varies the radial distance between any and all spreading surfaces and the center axis by an identical amount. It is also possible that the distance between each spreading surface and the center axis is individually varied by the actuator so that several spreading surfaces can have different distances from the center axis.

Preferably, the actuator is embodied so that the radial distance between the spreading surfaces and the center axis in the extended position is adjustable or adjusted to a preset value. This allows adjusting the clearance between the expanded pipe end and a section of a connecting element inserted therein specifically to a predetermined play or oversize.

In order to take the temperature dependency of the shrinking process on a plastic pipe into account appropriately, the actuator can be embodied such that it adjusts the radial distance between the spreading surfaces and the center axis in the extended position of the spreading elements depending on the temperature, in particular ambient temperature. This will counteract the impact of the temperature dependency of the shrinking process on the time it takes to achieve a firm and stable pipe connection. Preferably, the actuator is embodied in a manner so that with decreasing ambient temperatures in which pipe connections are to be realized, the distance between the spreading surfaces and the center axis in the extended position of the spreading elements is decreased so that the play between the expanded pipe end and the section of a connecting element inserted therein is thereby decreased and thus, the firm and stable pipe connection is achieved already after a minor amount of reshrinking.

For taking into account the temperature when setting the radial distance between the spreading surfaces and the center axis, an input unit, in particular, an electrical input unit can be provided by means of which values for a temperature or similar temperature information can be entered in order to provide the actuator or an electrical control unit connected to the actuator with information on the temperature during the fabrication of the pipe connection, so that the actuator can accordingly adjust, or preferably automatically adjusts, the radial distance between the spreading surfaces or each spreading surface and the center axis, based on the value(s) entered.

It is also possible for the actuator to be manually actuatable.

According to one embodiment of the invention it is provided for the spreading elements to be non-rotatably attached to the actuator. This allows simple and safe handling of the device according to an embodiment of the invention during expansion of the pipe end since the spreading elements can be relatively easily threaded into the pipe end without them twisting relative to the actuator. At the same time, despite the spreading elements being non-rotatably attached, the radial distance between the spreading elements and the center axis can be adjusted by means of the actuator.

The spreading elements can also be rotatably attached to the actuator.

Preferably, the spreading elements are attached to the actuator removably; e.g., bolted to the actuator or the actuator housing by means of a threaded connection. For this purpose, a thread may be embodied on the actuator or the actuator housing.

According to an embodiment of the invention, fasteners are provided by means of which the radial distance between the corresponding spreading surface and the center axis in the extended position can be locked.

Due to the fact that the radial distance between the corresponding spreading surfaces and the center axis in the extended position is lockable by means of the fasteners, the radial distance between the spreading surfaces or the corresponding spreading surface and the center axis in the extended position can also be exactly held even under the impact of forces; e.g., in the context of an expanding procedure being performed on a pipe end. Thus, the fasteners allow expanding a pipe end to a minimal oversize exactly and with high precision. The expansion of another pipe end to the same minimal oversize can also be exactly replicated with high precision. Thus, the device according to an embodiment of the invention allows, in order to achieve a firm pipe connection, aiming at the smallest possible reshrinking process of the pipe end in order to achieve a firm connection by sufficient reshrinking between the pipe with its expanded end and the pipe inserted into the expanded end, even at lowest ambient temperatures.

The fasteners prevent any unwanted change in the setting of the radial distance between the spreading surfaces and the center axis in the extended position set by means of the actuator during threading-in of the spreading elements into the pipe to be expanded or during removal of the spreading elements from the expanded pipe.

According to one embodiment of the invention it is provided for the fasteners to exert their effect independently of the actuating mechanism for adjusting the radial distance between the corresponding spreading surface and the center axis in the extended position. This results in the fasteners being decoupled from the actuator in their fastening function, so that the locking process for the set radial distance between the spreading surfaces and the center axis in the extended position can be flexibly performed without being impinged on by the actuator.

It can also be provided for the actuator to perform the function of the fastener. E.g., the actuating mechanism of the actuator can be implemented by means of threads brought into effective contact with each other, with these threads being self-locking and insofar having a locking effect with regard to the set radial distance between the spreading surfaces and the center axis in the extended position.

According to another embodiment of the invention it is provided for the actuator to be designed movably on a transmission member for transferring an actuation motion to the spreading elements, in particular its housing, and/or the mechanism for moving the spreading elements from the starting position to the extended position, in particular its housing so that the actuator, for changing the radial distance between the spreading surfaces and the center axis, performs a propulsion motion in the axial direction, e.g., when the actuator is actuated manually. This results in the actuator being integrated into the device by means of a simple design, in order to be able to change the radial distance between the spreading surfaces and the center axis in the extended position of the spreading elements without impinging upon the function of the transmission member or the mechanism for moving the spreading elements from the starting position into the extended position.

Having the actuator perform a propulsion motion in the axial direction implements a technologically particularly simple design for allowing the radial distance between the spreading surfaces and the center axis in the extended position of the spreading elements to be changeable or changed. The propulsion motion can, e.g., be implemented by a threaded connection of the actuator that is screwed into the housing of the transmission member, with the propulsion motion being achieved by rotating the threaded connection relative to the housing of the transmission member.

A motion limiter can be provided for the actuator by means of which the propulsion distance of the actuator is limited. This ensures a safe motion of the actuator up to the limiter, while also preventing a failure due to unscrewing of the actuator from the threaded connection of the housing.

According to one embodiment of the invention, the fasteners are embodied by at least one fastening element designed to be movable on the housing of the transmission member or the mechanism for moving the spreading elements from the starting position to the extended position, or at the actuator, and which fastening element can be brought into a friction-fitted or form-fitted effective position for locking the set radial distance between the corresponding spreading surface and the center axis in the extended position. This ensures a technologically simple implementation for locking the radial distance set between the spreading surfaces and the center axis by means of the actuator.

If the actuator is embodied to perform a propulsion motion in the axial direction, the actuator can be lockable against a propulsion motion in an axial direction relative to the housing by means of the fastener.

The fastener may be a threaded pin, a setscrew or a connecting element similarly equipped with threading, which the operator of the device according to an embodiment of the invention brings, e.g., into a clamping position and/or a detent position against the housing or the actuator in order to lock the radial distance set by means of the actuator between the spreading surface and the center axis in the extended position.

The fastener can also be a detent element attached to the housing or the actuator that can be brought into an effective position, e.g., by the force of a spring element, in a catch on the actuator or the housing for causing a locking effect. Here, several catches can be provided so that the locking of the radial distance set between the spreading surfaces and the center axis in the extended position is preferably performed automatically when the fastener reaches one of the catches in a detent or locking position during the setting of the radial distance.

The detent element can, e.g., be embodied as an elastic pressure part, and the catch can be embodied by several spherical depressions into each of which the elastic pressure part can snap. The spherical depressions can be arranged at preset intervals in order to achieve precise setting of the radial distance between the spreading surfaces and the center axis in the extended position by forming a locking connection or a detent connection.

According to another embodiment of the invention it can be provided for the transmission member to be embodied as a piston movable back and forth translatorily, which piston is movable axially outward in an opening formed by the spreading elements with the spreading elements radially extended. Such a transmission member can be implemented in a technologically simple manner and allows a particularly simple expansion of the spreading elements in a radial direction.

Advantageously, the stroke of the piston having an effect on the spreading elements is variable by a distance by means of the actuator. The fact that the actuator impinges upon the piston stroke allows adjusting the radial distance between the spreading surfaces and the center axis in the extended position of the spreading elements in a technologically especially simple manner.

According to a preferred embodiment of the invention, an electrical control unit is provided activating the mechanism for moving the spreading elements such that, over several consecutive cycles or processes, the spreading elements are moved from the starting position or an intermediate position to the extended position or an intermediate position; in particular, back from there to the starting position or an intermediate position. This facilitates expanding the end of a plastic pipe for the installer; in particular, when the expansion of the pipe end is performed in several stages. The installer merely needs to turn on the device according to an embodiment of the invention or activate the control unit so that the several consecutive cycles or spreading processes are executed by the spreading elements without additional activation of the control unit or the device according to an embodiment of the invention being required.

This favors and facilitates in particular a step-by-step expansion process since the installer can, after each pipe end expansion cycle, push the spreading elements further into the pipe end that has already been expanded in a previous step in order to then perform another partial expansion in the subsequent cycle. The pipe end is thus expanded in a particularly simple manner by means of the several consecutive expansion processes to intermediate dimensions until the desired final expansion dimension has been reached.

Preferably, the electrical control unit activates the mechanism for moving the spreading elements such that, after each motion cycle of the spreading elements or each expansion process by means of the spreading elements, the spreading elements remain in the starting position or an intermediate position essentially without moving for a preset period. This rest phase shall preferably last for a time period sufficient for the installer to comfortably push the pipe end expanded in the previous cycle further onto the spreading elements before a new expansion process starts.

Preferably, at least one actuating element for turning on or activating the control unit and if applicable, the mechanism for moving the spreading elements, should be provided. Preferably the mechanism for moving the spreading elements should be embodied as an electrical drive or have an electrical drive for moving the spreading elements. The electrical drive can be a grid-operated electrical motor. An electrical motor operated by a rechargeable battery is also possible as an electrical drive.

At least one actuating element can be provided whose actuation ends the motion of the spreading elements. This allows not completing the preset, several consecutive cycles to the end, but instead, to end the expansion motion of the spreading elements earlier. The actuating element, in particular, the actuating element and the control unit shall preferably be embodied such that the consecutive motion cycles of the spreading elements are ended by only finishing the cycle in progress when the actuating element is actuated.

In addition, the actuating element for turning on and the actuating element for ending the motion cycles of the spreading elements can be embodied by a shared operating element.

According to an additional embodiment of the invention it is provided for the spreading elements to be movable for a distance in a radial direction with regard to the center axis, which distance is smaller than the radial distance between the interior surface of the finally expanded pipe and the center axis. This safely prevents, in a simple design, the expansion of the pipe end from being performed by only a single expansion process. Such a single expansion process of the spreading elements for expanding the pipe end must be avoided particularly in pipes made of plastic having a shape memory since it will result in undesirable strong indentations on the inside of the expanded pipe end caused by the spreading surfaces. Such strong indentations are undesirable since they favor the forming of leaks in the pipe connection.

According to an additional embodiment of the invention, an optical and/or acoustical output unit is provided that outputs the preferably preset radial distance between the spreading surfaces and the center axis in the extended position directly and/or indirectly, e.g., by indicating an oversize dimension or a diameter. This measure supports the user-friendliness of the device according to an embodiment of the invention and its simple handling since the installer receives the information with regard to, e.g., to what maximum dimension the pipe end can be expanded.

According to an additional embodiment, the invention provides a procedure for expanding the end of a pipe made of a plastic having a shape memory.

The procedure works particularly by means of a device of the type described above.

With regard to the procedure, according to an embodiment of the invention it is provided for the radial distance set between the spreading surfaces and the center axis in the extended position to be changed by means of an actuator of the device before the pipe end is expanded.

This measure allows varying the play in the radial direction, with which play the expanded end of the pipe surrounds the section of a connecting element inserted therein. The play can be decreased such that the expanded pipe end need only reshrink by a minor amount in order to effect a firm and stable connection with the connecting element. This can be used to effectively counteract the slow reshrinking at low temperature occurring frequently when pipes are laid in cold winter months, by decreasing the radial distance between spreading surfaces and center axis in the extended position so much that a connecting element, e.g., can barely still be inserted without using a special insertion tool. Thus, a firm connection between the pipe and the connecting element will already be achieved even with a minor shrinking process.

According to an embodiment of the invention, before the pipe end is expanded, it is provided for the radial distance between the spreading surfaces and the center axis in the extended position to be set by an actuator, in particular an actuator of the type described above, and for the set radial distance then to be locked by means of a fastener. This exactly holds the radial distance set between the spreading surfaces and the center axis in the extended position even under the impact of forces, such as in the context of an expansion procedure performed on a pipe end. The pipe end can thus be expanded to a minimal oversize exactly and with high precision, which allows, for achieving a firm pipe connection, aiming at the smallest possible amount of reshrinking of the pipe end. This in turn makes it possible to achieve, without any problems, a firm connection even in the lowest ambient temperatures due to sufficient reshrinking between the pipe with its expanded end and the pipe inserted into the expanded end.

According to a further development of the procedure, it is provided for the radial distance between the spreading surfaces and the center axis in the extended position of the spreading elements to be set to a predetermined value before the pipe end is expanded. This allows adjusting the clearance between the expanded pipe end and a section of a connecting element inserted therein specifically to a predetermined play or oversize.

Depending on the temperature, in particular, the ambient temperature, the radial distance between the spreading surfaces and the center axis in the extended position of the spreading elements is set to a predetermined value, in particular, set automatically.

An advantageous further development of the procedure consists of the pipe end being expanded by means of several motion cycles of the spreading elements, with the spreading elements being moved in each motion cycle from the starting position or an intermediate position into the extended position or an intermediate position while the pipe end is being expanded, and then, with the spreading elements being moved back into the starting position or an intermediate position, with the spreading elements being inserted into the pipe end after at least one motion cycle. This ensures that no or merely negligible line imprints are generated on the interior surface of the expanded pipe end by the pressure from the spreading elements during the expansion procedure, while an expansion dimension with an expansion over a relatively large distance in the radial direction is achieved.

In addition, an embodiment of the invention comprises the use of a device for expanding a pipe end of the type described above for expanding the end of a pipe made of a plastic having a shape memory. Here, the expansion of the pipe end is preferably performed using a procedure of the type described above.

An embodiment of the invention also comprises an adapter for a device for expanding the end of a pipe of the type described above. The adapter is connectable to the mechanism for moving the spreading elements of a device for expanding the ends of a pipe of the type described above, and embodied to connect to an expander head, with the adapter embodying, at least partially, the actuator of the device.

According to one further development it is provided for the adapter to embody, at least partially, the actuator and the fasteners of the device.

Figure 1B:
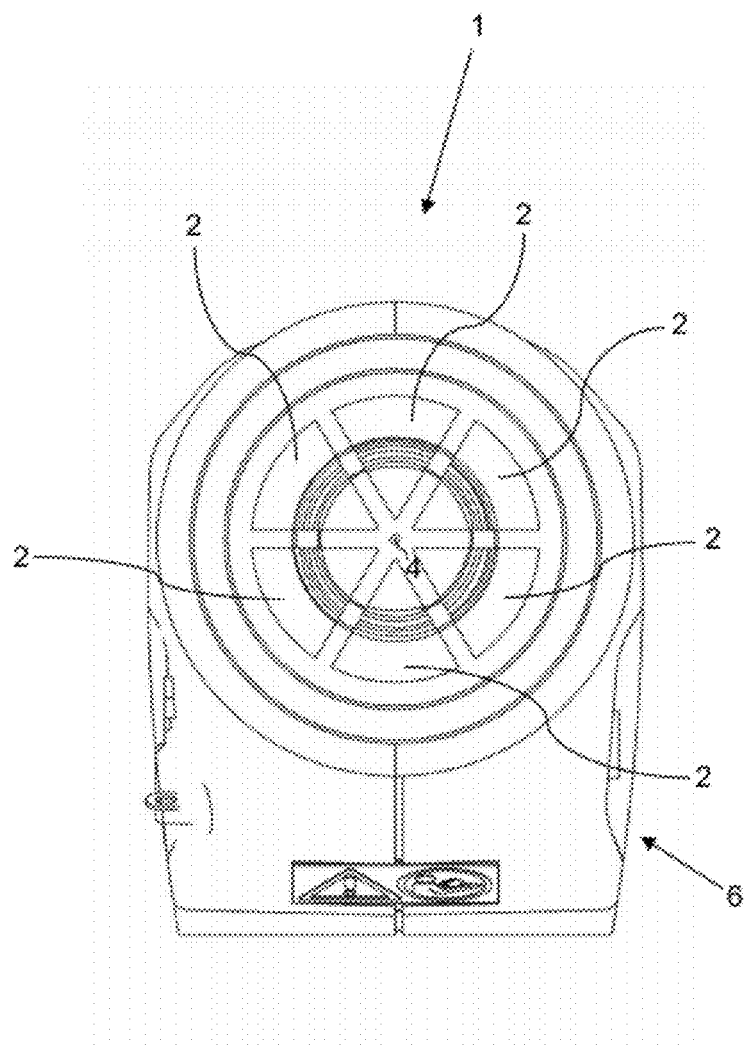
FIG. 1B shows the device according to FIG. 1A, as a front view, with the spreading elements of the device being set to a first maximum expansion dimension and being in the radially outward-extended position.

FIGS. 1A and 1B show—in a schematic representation—a device 1 for expanding a pipe end, in particular the end of a pipe made of a plastic having a shape memory. The device, 1, has several spreading elements, 2, arranged distributed around a center axis 4 of device 1. Spreading elements 2 have at least one spreading surface, 3, that can be brought into an effective position against the interior surface of the end of a plastic pipe in order to expand the pipe end in the radial direction.

For expanding the pipe end, spreading elements 2 are movable in the radial direction with regard to center axis 4 from a starting position into an outward-extended position. In the starting position, spreading elements 2 are insertable into the pipe end by a predetermined longitudinal distance in the direction of center axis 4. In the extended position, spreading elements 2 with their corresponding spreading surfaces 3 are brought into an effective position against the interior surface of the pipe end so that the pipe end is expanded by transferring spreading elements 2, which are inserted into the pipe end, from the starting position into the extended position. Device 1 further possesses a mechanism, 6, for moving spreading elements 2 from the starting position into the extended position and preferably back into the starting position.

An actuator, 7, is provided by means of which the radial distance is variable between the corresponding spreading surface 3 and center axis 4 in the extended position of spreading elements 2, variable in particular, manually.

For this purpose, actuator 7 is attached movably to mechanism 6 for moving the spreading elements 2 from the starting position into the extended position, so that actuator 7 performs a motion toward center axis 4 for changing the radial distance between spreading surfaces 3 and center axis 4. For this purpose, actuator 7 is preferably movably attached to the housing, 11, of mechanism 6.

Preferably, spreading elements 2 are also non-rotatably attached to actuator 7, in particular, removably attached.

Mechanism 6 for moving spreading elements 2 from the starting position into the extended position is mechanically coupled with a transmission member, 8, transferring an actuation motion to spreading elements 2.

Preferably, mechanism 6 for moving spreading elements 2 from the starting position into the extended position possesses a piston, 18, guided inside housing 11 of mechanism 6. Preferably a piston 9, of transmission member 8 is mechanically connected to piston 18, in particular, permanently connected in the axial direction. Piston 9 and piston 18 can also be embodied by a shared component.

Piston 9 of transmission member 8 preferably lies inside actuator 7 and is preferably guided translatorily movable back and forth along wall of actuator 7.

Piston 9 of transmission member 8 is outward-movable toward center axis 4 in an opening, 10, formed by spreading elements 2, with spreading elements 2 extending outward. Preferably, piston 9 is embodied like a cone or a truncated cone at its front end. These preferably slanted surfaces of piston 9 come into an effective position with corresponding interior surfaces of spreading elements 2 when piston 9 is moved outward in an axial direction. Due to this extension motion of piston 9, the cone-shaped circumferential surface of piston 9 glides along the corresponding interior surfaces of spreading elements 2, thus facilitating the radial extension of spreading elements 2.

As can be seen from FIG. 1A, the actuator can be embodied by a shaft section, 12, having threads at its axial end, preferably external threads, 13, mating with corresponding threads of housing 11. Preferably, shaft section 12 has at its end threads, in particular, external threads, 14, used to screw on a connecting element, 15, serving to connect spreading elements 2 to shaft section 12. By means of connecting element 15, spreading elements 2 are non-rotatably attachable to shaft section 12. The threaded connection of shaft section 12 with housing 11 allows changing the stroke of piston 9 by a distance X using the actuator, which stroke impinges upon spreading elements 2.

Spreading elements 2 and connecting element 15 form an expander head, 19, that can be screwed onto actuator 7.

As can be seen from FIG. 1A, there, shaft section 12 is moved outward from housing 11 by distance X in the axial direction. This shift is limited by a stop embodiable, e.g., by a projection created by at least one fastener, 16, in particular a pin element. The projection protrudes, e.g., into the threaded opening of housing 11, and shaft section 12 hits this projection when maximum distance X is reached.

Fastener 16 can be a connecting element having threads, e.g., like a setscrew or threaded pin, by means of which actuator 7 is securable against rotating relative to housing 11. For this purpose, fastener 16 screwed into housing 11 can be screwed in so far toward actuator 7 that fastener 16 pushes against actuator 7, creating a clamping connection, thus locking actuator 7 against a rotating motion relative to housing 11.

By rotating shaft section 12 into the opposite direction, shaft section 12 is moved toward housing 11 until a collar, 17, of shaft section 12 makes contact with the face of housing 11, thus limiting the motion of shaft section 12 in this axial direction.

FIG. 1A shows device 1 in that position of actuator 7 in which the stroke of piston 9 impinging upon spreading elements 2 is shortened by distance X by actuator 7. For this purpose, shaft section 12 is unscrewed by distance X away from housing 11 in the axial direction. In this state, device 1 is set to a first maximum expansion dimension D1 as the interior diameter for the expanded end of the plastic pipe. FIG. 1A shows spreading elements 2 in this state in the extended position.

Figure 2:
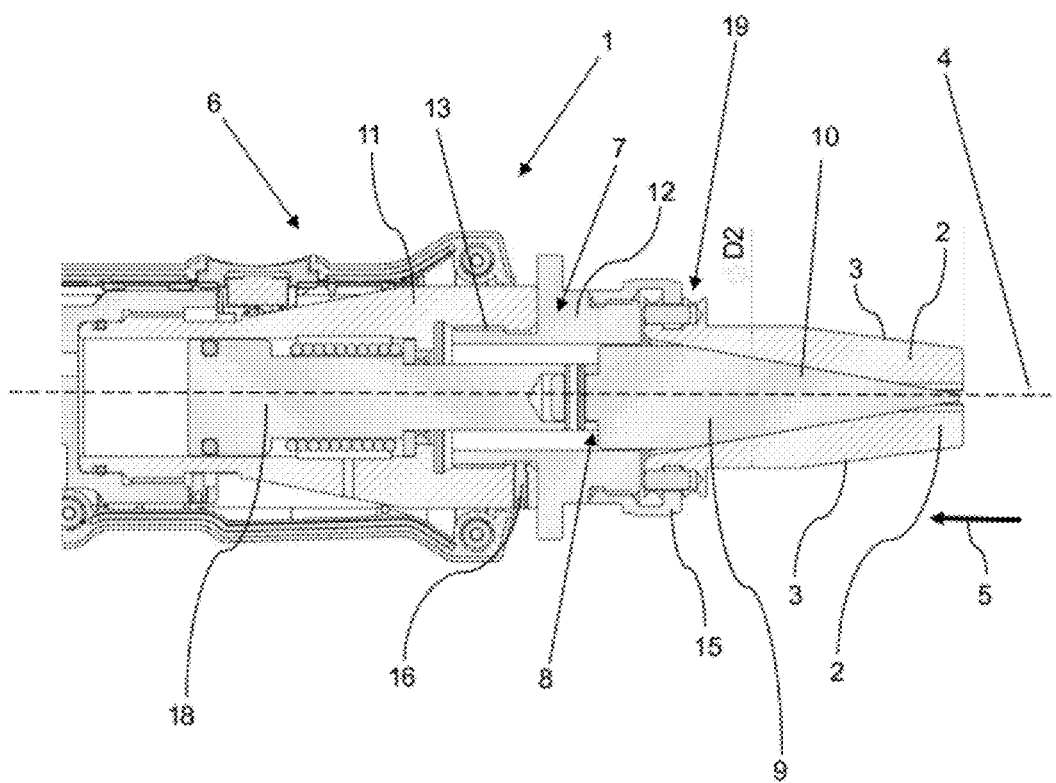
FIG. 2 shows the device according to FIG. 1A, as a longitudinal section view, with the spreading elements of the device being set to a second maximum expansion dimension and being in the outward-extended position.

FIG. 2 shows device 1 in the extended position of spreading elements 2, which device is set to a second maximum expansion dimension D2 by means of actuator 7. Actuator 7 is moved toward housing 11 in the axial direction; in particular, shaft section 12 is screwed against the face of housing 11 up to the stop of its collar 17. This results in the stroke of piston 9 impinging upon spreading elements 2 being increased by distance X by means of actuator 7, causing device 1 to be set to second maximum expansion dimension D2, which is greater than first maximum expansion dimension D1.

By rotating shaft section 12 between the positions shown in FIG. 1A and FIG. 2, the maximum expansion dimension of device 1 can, as required, be freely set, in particular, variably, between maximum expansion dimension D1 and maximum expansion dimension D2.

Figure 3:
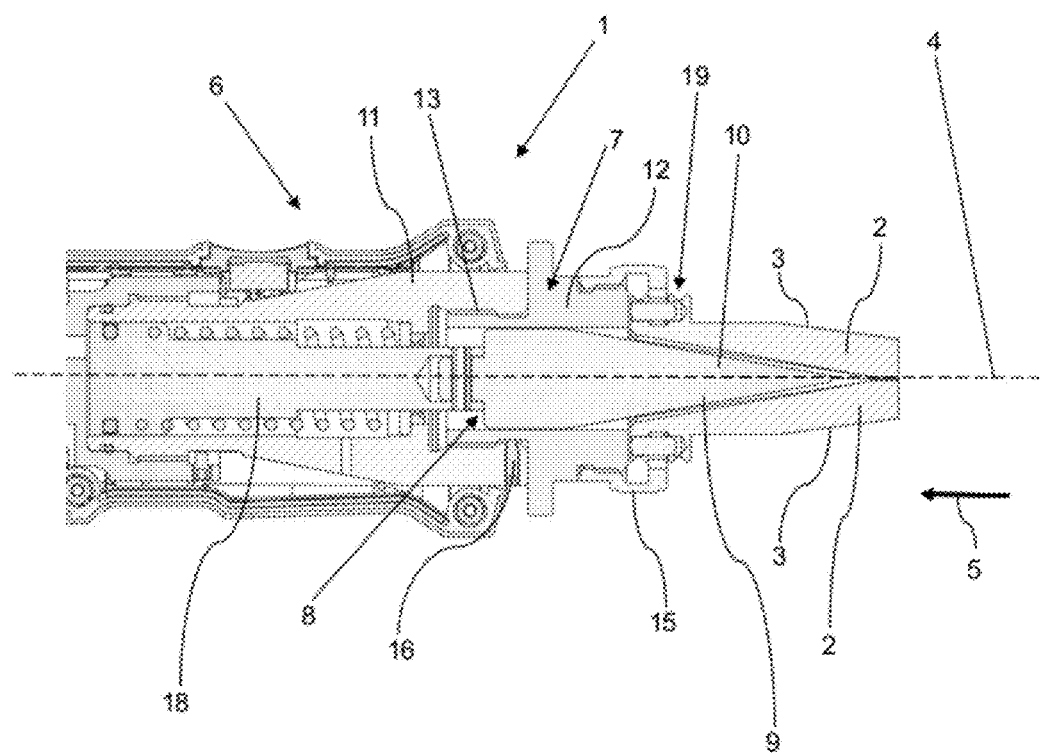
FIG. 3 shows the device according to FIG. 1A, as a longitudinal section view, with the spreading elements of the device being set to a second maximum expansion dimension according to FIG. 2 and being in a starting position.

FIG. 3 shows device 1 for expanding a pipe end according to FIGS. 1A and 1B, with spreading elements 2 being set to the second maximum expansion dimension D2 in FIG. 3. In contrast to FIG. 2, spreading elements 2 are in the starting position. In the starting position, piston 9 has been brought into a retracted position, together with piston 18. In the starting position, spreading elements 2 are insertable into the end of the pipe to be expanded by a predetermined longitudinal distance in the direction of center axis 4.

According to an embodiment, a sensor element can be provided by means of which the position of actuator 7, in particular of shaft section 12 is captured in an axial direction relative to housing 11, e.g., in order to use the information provided by the sensor element in an electrical control unit; e.g., for activating actuator 7 automatically by means of the control unit, in order to be able to set actuator 7 automatically to a predetermined maximum expansion dimension.

Spreading elements 2 are preferably embodied such with their corresponding spreading surface 3 that, with regard to center axis 4, the radial distance of the corresponding spreading surface 3 in insertion direction 5 of spreading elements 2 as viewed into the end of the pipe, from front to back, becomes at least partially larger, in particular, spreading surfaces 3 together embody a cone-shaped circumferential surface increasing in width from front to back, over an axial section.

This is advantageous for expanding the pipe end using several motion cycles of spreading elements 2, by moving, during each motion cycle, spreading elements 2 from the starting position into the extended position while the pipe end is being expanded, and spreading elements 2 are then moved back into the starting position, with spreading elements 2 being inserted further into the pipe end after at least one motion cycle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A device for expanding an end of a plastic pipe, the device comprising:

a plurality of spreading elements radially movable from a center longitudinal axis of the device from a starting position, at which the spreading elements close along said axis and are insertable by a predetermined distance into the pipe end, to an outward-extended position radially distanced from said axis so as to expand the pipe end, each of the spreading elements having an outer spreading surface configured to press against an interior surface of the pipe end;

a mechanism configured to provide said movability of the spreading elements;

a piston configured to spread the spreading elements from the starting position to the outward-extended position by moving along said axis from a retracted piston position to a fully extended piston position against interior surfaces of the spreading elements;

an actuator radially outward from the piston, the actuator configured to translate the spreading elements along said axis from a first configuration to a second configuration a distance axially outward from the first configuration, the fully extended piston position in the second configuration spreading the spreading elements to a lower radial distance at the outward-extended position with respect to the first configuration; and at least one fastener configured to lock the device into either the first configuration or the second configuration during use.

2. The device according to claim 1, wherein the mechanism is configured to move the spreading elements from the outward-extended position back to the starting position.

3. The device according to claim 1, wherein the at least one fastener is configured to be operated independently of the actuator.

4. The device according to claim 3, wherein the actuator is movably attached to a housing of the mechanism so that the actuator performs a propulsion motion in an axial direction of the device to provide the translation.

5. The device according to claim 4, wherein the at least one fastener is movably attached to one of a housing of the piston, the housing of the mechanism, and the actuator, and
wherein the at least one fastener is configured to be brought into one of a force-fitted and a form-fitted effective position against one of the actuator and the housing of the mechanism to provide said locking.

6. The device according to claim 1, wherein the actuator is movably attached to a housing of the piston and a housing of the mechanism.

7. The device according to claim 6, wherein the at least one fastener is movably attached to one of the housing of the piston, the housing of the mechanism, and the actuator, and
wherein the at least one fastener is configured to be brought into one of a force-fitted and a form-fitted effective position against one of the actuator and the housing of the mechanism to provide said locking.

8. The device according to claim 1, wherein the actuator is configured to conduct said translating based on a temperature.

9. The device according to claim 8, wherein the temperature is an ambient temperature.

10. The device according to claim 1, further compromising an electrical control unit configured to activate the mechanism such that the spreading elements are moved in a plurality of consecutive cycles from the starting position to one of an intermediate position and the outward-extended position, and from there, respectively, to one of the outward-extended position and back to the intermediate position.

11. The device according to claim 1, wherein the spreading elements are movable radially by a distance that is smaller than a radial distance between the center axis and the interior surface of the expanded end of the pipe.

12. The device according to claim 11, further comprising at least one of an optical and an acoustical output unit configured to output radial distance of the spreading elements from said axis.

13. The device according to claim 1, further comprising at least one of an optical and an acoustical output unit configured to output radial distance of the spreading elements from said axis.

14. The device according to claim 13, wherein the at least one of an optical and an acoustical output unit is configured to output the radial distance as at least one of an oversize and a dimension.

15. A method for expanding an end of a pipe made of a plastic having a shape memory using the device of claim 1, the method comprising:
inserting the spreading elements, in the starting position, into the end of the pipe by a predetermined longitudinal distance;
setting one of the first and second configurations by the actuator;
locking the set configuration by the at least one fastener; and
moving the spreading elements having the locked configuration by the piston from the starting position to the outward-extended position so as to expand the end of the pipe.

16. The method according to claim 15, wherein the actuator is operated based on an ambient temperature.

17. The method according to claim 15, further comprising moving the spreading elements from the outward-extended position back to one of the starting position and an intermediate position, movement of the spreading elements from the starting position to the outward-extended position and back to one of the starting and intermediate positioned being performed in a plurality of consecutive motion cycles, wherein the method further comprises inserting the spreading elements further into the end of the pipe after at least one of the motion cycles.

18. A method of expanding a pipe end, the method comprising contacting the pipe end with the device of claim 1 so as to expand the pipe end.

* * * * *